April 5, 1932. E. HAEFELY 1,852,718
ELECTRICAL CONDENSER
Filed Sept. 19, 1930
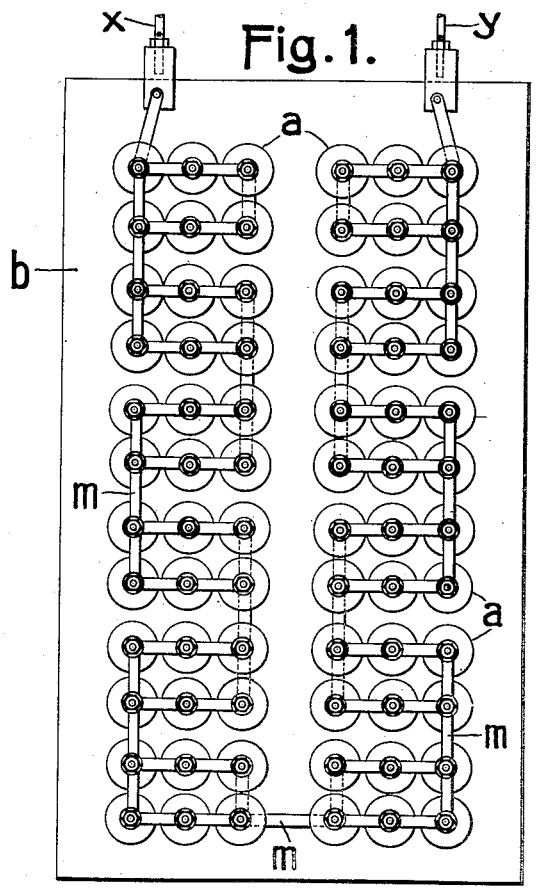
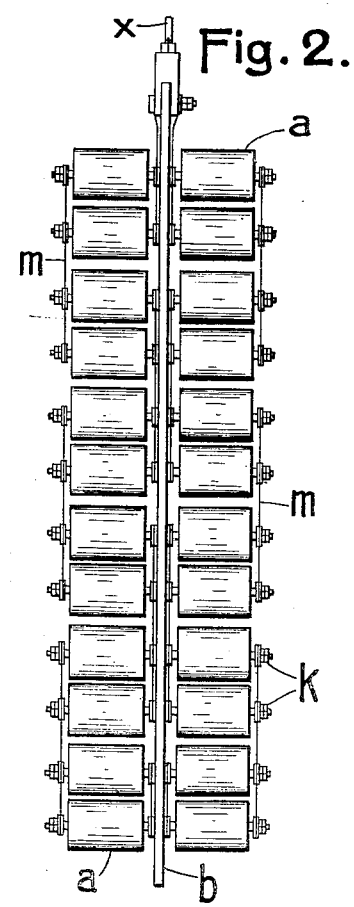
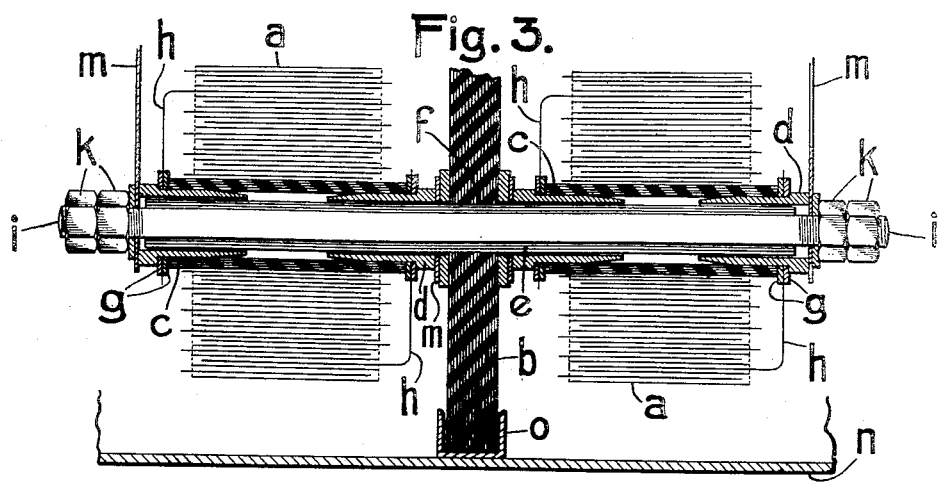
Inventor:
E. Haefely
by Langner, Parry, Card & Langner
Attys.

Patented Apr. 5, 1932

1,852,718

UNITED STATES PATENT OFFICE

EMIL HAEFELY, OF BASEL, SWITZERLAND

ELECTRICAL CONDENSER

Application filed September 19, 1930, Serial No. 483,051, and in Switzerland October 3, 1929.

A known type of electrical condensers consists of a battery of individual condenser units, which very often are arranged in groups or rows and are mounted in a cage-like frame. Up to the neighbourhood of 1000 volts it is possible to build each unit of such a battery, in such a manner that it will withstand the whole working voltage and therefore only parallel connections of the units are generally provided to obtain the desired capacity of the integral condenser.

If higher voltages are to be used, besides the parallel connections of the units to groups, series connections of such groups will be unavoidable in such multiple condensers and difficulties of some kind in mounting and conveying the connections will occur, especially if it is desired to avoid any soldered joints to establish the connections.

The present invention has for its object a multiple condenser in which these difficulties are obviated.

In the condenser according to this invention, condenser units of the wound type are mounted on an upright supporting frame plate of insulating material, such as pressed paper, so as to freely project from at least one lateral side of the plate, the said units being arranged on shafts or core pieces projecting laterally from the plate so that they are easily accessible at their outer end for connection or other purposes.

Advantageously the connection of the condenser units to one another is effected through conductors at each unit by clamping action. The condenser units are preferably distributed over both sides of the carrier plate. In this case it may be convenient to arrange each unit on one side of the plate with a unit on the other side thereof in the same longitudinal alignment on a common core and to ensure their seating on the plate and their electrical connection by means of a suitable screw pressure device.

The invention will now be described, by way of example, with reference to the accompanying drawings, in which:

Figure 1 illustrates a front elevation of the multiple condenser constructed according to the invention.

Figure 2 is a side elevation thereof.

Figuer 3 is an enlarged partial transverse section corresponding to Figure 2.

According to the constructional embodiment illustrated in the drawings, the horizontal condenser units $a$ arranged in batteries are mounted laterally projecting from both sides of an upright supporting plate $b$ consisting of an insulating material, for instance pressed paper, each condenser unit on one side of the supporting plate being in axial alignment with a corresponding unit mounted on the other side of the supporting plate. The condenser units are of the well known wound type. According to Figure 3 they are provided with a hollow core $c$ of insulating material by means of which they are mounted on two supporting metal bushings $d$. The latter are slidden upon an insulating core $e$ passing through an opening $f$ of the supporting plate $b$ in which it fits as closely as possible, the insulating core $e$ being thus common to two condenser units in axial alignment with one another. The supporting bushings $d$ are provided with a collar. Two clamping washers $g$ are interposed between this collar and the adjacent end of the corresponding core $c$, the connecting strips $h$ leading to the condenser unit terminals being clamped in between these two washers. The common core $e$ is made hollow and a bolt $i$ carried through the axial bore thereof is provided at its ends with a threaded portion to receive two clamping nuts $k$.

These nuts serve on one hand to ensure a firm seating of the condenser units on the supporting plate $b$, on the other hand as a means to establish good electrical contact with the terminal connecting strips $h$, as well as with connecting bars $m$ the purpose of which is to connect the condenser units among themselves. It is indeed obvious that a tightening of the nuts $k$ will clamp and firmly hold the connecting bars $m$ against the bushes $d$ and by means of the bush couples and the pressure transmitting cores $c$ press the clamping washers $g$ against each other to firmly fasten the connecting strips $h$ between them as well as to tighten the entire structure on the supporting plate $b$, ensuring thus a rigid constructional arrangement. The connecting bars m which advantageously consist of flat sheet metal strips are provided for the coupling of the condenser units in series or parallel relation with respect to the supply conductors x, y. These connections can be made quickly and without trouble.

The supporting plate b together with the condenser units is advantageously set in an oil tank n (Figure 3), two guiding rails, such as shown at o, being fixed on opposite walls thereof, in which the plate is slidably mounted.

An advantage of this arrangement is the great facility with which the individual units can be mounted and interconnected. This is very important with regard to the economy of the condenser, the present construction saving considerable time and work in assembling the same compared with other known constructions.

The multiple condenser as described is especially suitable for high voltage conditions, but it can also be used, of course, for low voltages.

It is evident that in accordance with higher voltage conditions, two or more supporting plates with condenser units can be mounted in parallel connection to each other, the batteries of condenser units thereof being connected to one another in a suitable manner.

What I claim is:—

1. A multiple electrical condenser comprising an upright supporting frame plate of insulating material, laterally projecting shafts thereon, and condenser units of the wound type engaged over said shafts, so that their outer ends are freely accessible for connection purposes.

2. A multiple electrical condenser comprising an upright supporting plate of insulating material, laterally projecting shafts thereon, condenser units of the wound type engaged over said shafts so that their outer ends are freely accessible, and conducting pieces and clamping means at said ends for the interconnection of the condenser units.

3. A multiple electrical condenser comprising an upright supporting plate of insulating material, shafts thereon laterally projecting from both sides of said plate, and condenser units of the wound type mounted on said shafts on both sides of said plate so that their outer ends are freely accesible for connection purposes.

4. A multiple electrical condenser comprising an upright supporting plate of insulating material, shafts thereon laterally projecting from both sides of said plate, condenser units of the wound type mounted on said shafts on both sides of said plate, said shafts each comprising a core piece passing through said plate and provided with two seating bushes for each condenser unit, and a screw pressure device cooperating with the bushes for clamping the same in place on said core piece and against the supporting plate.

5. A multiple electrical condenser comprising an upright supporting plate of insulating material, shafts thereon laterally projecting from both sides of said plate, condenser units of the wound type mounted on said shafts on both sides of said plate, said shafts each comprising a hollow core piece passing through said plate and provided with two seating bushes for each condenser unit, clamping means for the condenser unit terminals, a screw bolt passed through said core piece, and clamping nuts on said bolt for producing a firm seating of the corresponding condenser unit on the supporting plate, as well as a tight electric connection of the condenser unit terminals.

In witness whereof I have hereunto signed my name this 4th day of September, 1930.

EMIL HAEFELY.